United States Patent [19]

Hodson

[11] Patent Number: 4,980,975

[45] Date of Patent: Jan. 1, 1991

[54] SECATEURS

[75] Inventor: James W. Hodson, Hindley Green, England

[73] Assignee: Bulldog Tools Limited, Lancashire, England

[21] Appl. No.: 382,745

[22] Filed: Jul. 21, 1989

[30] Foreign Application Priority Data

Jul. 23, 1988 [KR] Rep. of Korea ............ UM88-11884

[51] Int. Cl.⁵ ............................................. B26B 13/00
[52] U.S. Cl. ...................................... 30/262; 30/261; 30/254
[58] Field of Search .......................... 30/262, 261, 254

[56] References Cited

U.S. PATENT DOCUMENTS 2,189,211  2/1940  Lind ..................................... 30/262
4,031,621  6/1977  Arlett ................................... 30/262

Primary Examiner—Frank T. Yost
Assistant Examiner—Willmon Fridie, Jr.
Attorney, Agent, or Firm—Nixon & Vanderhye

[57] ABSTRACT

A pair of secateurs is provided comprising two handle (2,4) and blade (10,12) modules pivotally connected together such that when the two handles are moved towards one another, the two blades move towards one another to perform a cutting operation. The secateurs are such that each blade (10,12) can be released from each associated handle (2,4) without the use of tools, for replacement by a new or different blade. The invention makes it possible to replace worn or damaged blades without the need for any tools such as a spanner or screwdriver. It further allows the same pair of handles to be used with blades of differing configurations, making the secateurs much more versatile than known secateurs.

18 Claims, 7 Drawing Sheets

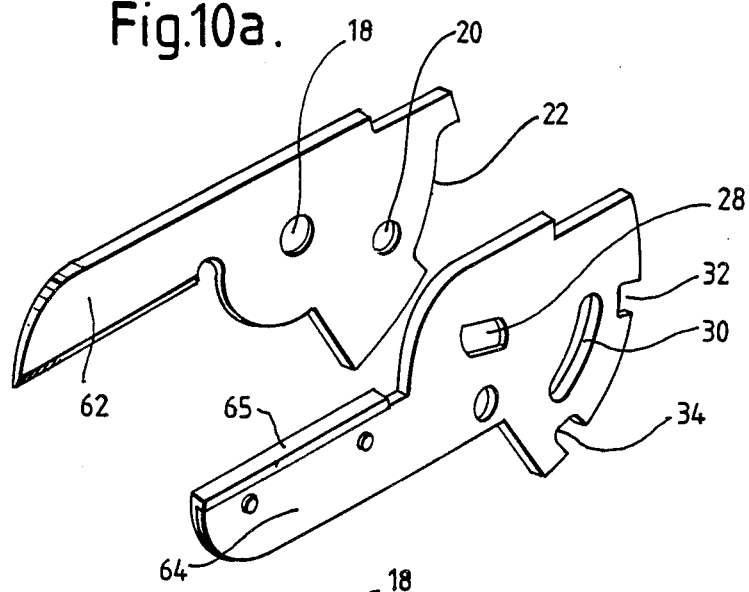
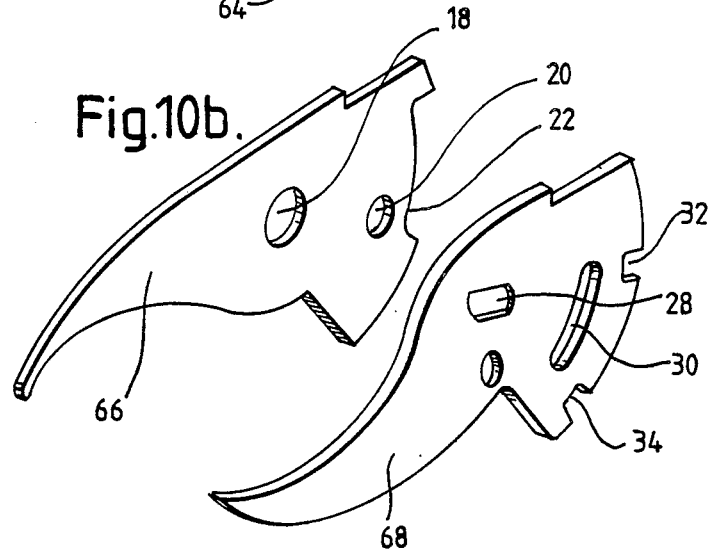

SECATEURS

The invention relates to pruner shears, or secateurs, for use in pruning, gardening, fruit culture and the like.

Different kinds of secateurs are known, for different uses, including the pruning of immature fruit, to improve growth and fruition, the trimming off of branches during fruit culture, and the pruning of buds, flowers and twigs, during gardening.

The different uses may require different types or shapes of blades. For example, a blade type known as the by-pass type may be used in trimming branches or pruning leaves, a type known as the anvil type has a chopping action, and a type known as the parrot beak type is used for cutting comparatively thick branches.

Known types of secateurs are designed for a single application, and are provided with blades appropriate to that application. When the blades are worn or damaged, the secateurs have to be scrapped The invention provides a pair of secateurs comprising two handle and blade modules pivotally connected together such that when the two handles are moved towards one another, the two blades move towards one another to perform a cutting operation, the secateurs being such that each blade can be released from each associated handle without the use of tools, for replacement by a new or different blade. The invention makes it possible to replace worn or damaged blades without the need for any tools such as a spanner or a screwdriver. It further allows the same pair of handles to be used with blades of differing configurations, making the secateurs much more versatile than known secateurs.

Preferably, each handle has a face shaped to receive a butt portion of the associated blade in a manner which prevents rotation of the blade with respect to the handle.

Each face may for example be provided with holes, pegs, cut-outs, projections or the like.

The modules are preferably pivotally connected together by manually rotatable screw threaded members.

One of the screw threaded members may have means to prevent its rotation with respect to the secateurs, another screw threaded member having a prominent rib which can readily be gripped between the fingers to rotate the member.

One of the screw threaded members may have a relatively large friction face for use in adjusting the force required to operate the secateurs.

Preferably the secateurs are provided in combination with at least one pair of replacement blades of different configuration, so that the secateurs can be adapted for different uses.

Preferably the secateurs are provided with means to lock them in the closed position.

The locking means may comprise a trigger positioned underneath the secateurs for convenient operation by the forefinger of the user.

The trigger preferably co-operates with another part of the secateurs such that the trigger has snap-action movement between clearly defined on and off positions.

The said other part of the secateurs may comprise a piece of cushioning material acting between the handles.

Preferably the secateurs have means to limit the extent to which the secateur blades can be moved apart.

There may be two limiting positions, so that either one of two different maximum opening positions may be selected, according to circumstances of use.

The secateurs may be such that in one position, they work through an arc of approximately 45° and in the other position they work through an arc of approximately 30°.

The limiting means may be operable conveniently by means of a conveniently located thumb catch.

At least one of the handles may be provided with means to cushion the hand.

Further cushioning means may be provided to cushion the engagement of the handles as the secateurs close.

Preferably, the secateurs are provided with spring means to urge the handles and blades apart, the spring means being enclosed and protected within the body of the secateurs.

By way of example, specific embodiments of the invention will now be described with reference to the accompanying drawings in which:

FIGS. 10a and 10b show two alternative pairs of blades for use with the second embodiment of secateurs.

Referring firstly to the embodiment shown in FIGS. 1 to 6, the secateurs have an upper handle 2 and a lower handle 4.

Figure 3:
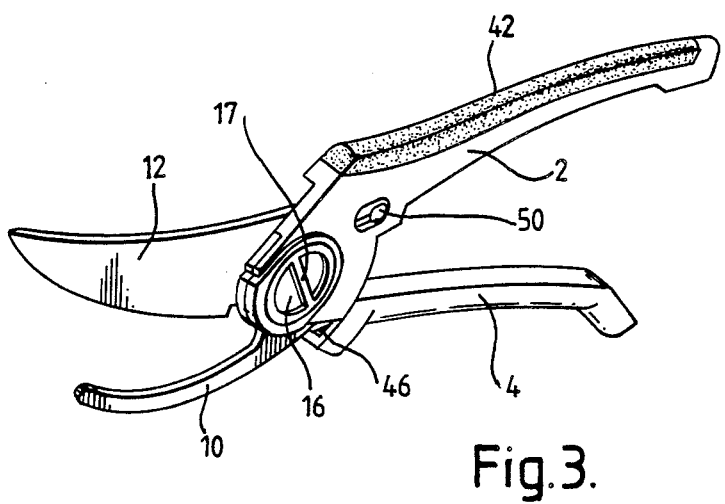
FIG. 3 is an assembled perspective view of the secateurs shown in FIG. 1 and 2.

In use, the upper handle 2 is fitted to a first blade 10 and the lower handle 4 is fitted to a lower blade 12. In use all these components are held together as best shown in FIG. 3, so that operation of the blades 10 and 12 can be controlled by movement of the handles 2 and 4. The faces 6 and 8 are so shaped, for example by the provision of stop members 9 and 11, that when the respective blade is fitted to the respective handle, the blade cannot pivot with respect to the handle, and effectively forms a single integrated module with the associated handle.

After assembly of the blades and handles, a pivot nut 14, which has a first cylindrical pivot part and a second non-pivot part with flats thereon, is passed firstly through a circular pivot hole 58 in the lower handle 4, then through a circular pivot hole 18 in the blade 12, then through an elongate hole 28 in the blade 10, which hole 28 mates with the flats of the nut 14, then through a similar elongate hole 60 in the upper handle 2, and finally through a washer. A bolt/adjusting screw 16 is then manually screwed into the nut 14, to hold all the parts together. The tightness with which the parts are held together can be adjusted by rotating the screw 16 using the projecting rib 17 (see FIG. 3) which can conveniently be gripped between the fingers.

Figure 5:
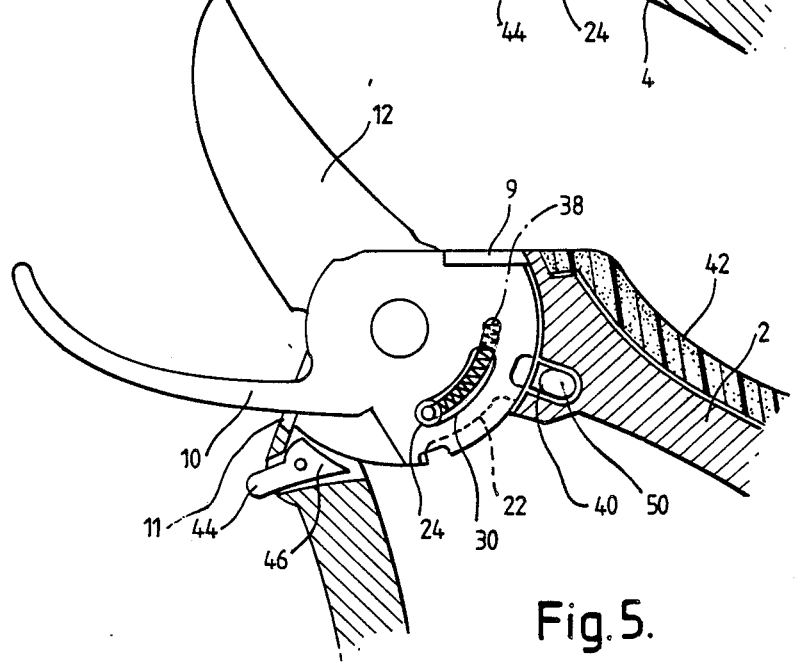
FIG. 5 is a view similar to FIG. 4 but showing the secateurs in the open position.

It is important for the blades to be urged into the open position as shown in FIG. 5, so that the blades can conveniently be moved into the closed, cutting position by simply pressing the handles 2 and 4 together.

This embodiment of secateurs uses an ingenious spring mechanism to urge the handles and blades apart.

The face 6 of handle 2 is provided with an arcuate groove 36, and a compression spring 38 is fitted into this groove.

Figure 4:
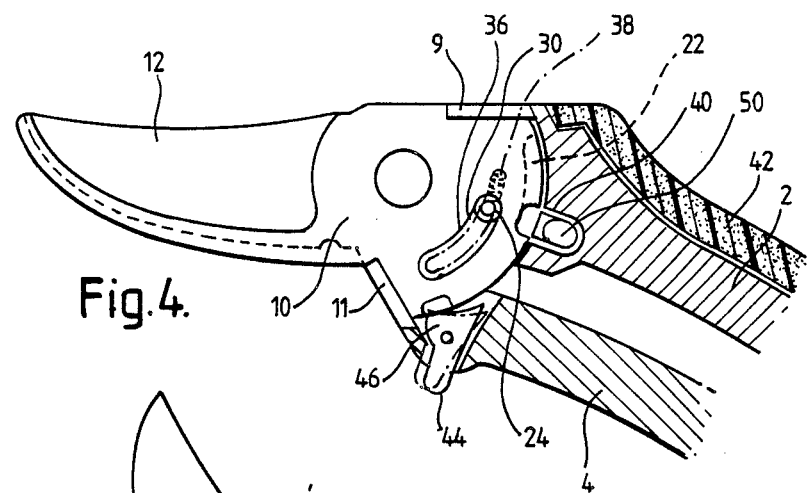
FIG. 4 is a side view, partly in section, showing the secateurs in the closed position.

The face 8 of the handle 4 is provided with a pin 24 which fits into a socket 26 in the face 8. The pin 24 projects through a hole 20 in the blade 12, passes through an arcuate slot 30 in the blade 10, and extends into the groove 36, to abut against one end of the spring 38. In other words the spring 38 acts between one end of the slot 36, and the pin 24. When the handles 2 and 4 are urged together, movement of the handle 4 with respect to the handle 2, causes the pin 24 to move along the slots 30 and 36, compressing the spring 38. FIG. 4 clearly shows the spring in its compressed state, and FIG. 5 clearly shows the spring in its uncompressed state.

When the secateurs are not in use, they can be locked in a safe, closed position, as shown in FIG. 4, by means of a locking trigger 44. The trigger 44 is pivotally mounted on the lower handle 4 and has a catch portion 46, which can be moved to engage in a groove 34 in the blade 10. The movement of the trigger 44 is clearly illustrated in FIG. 4.

Figure 1:
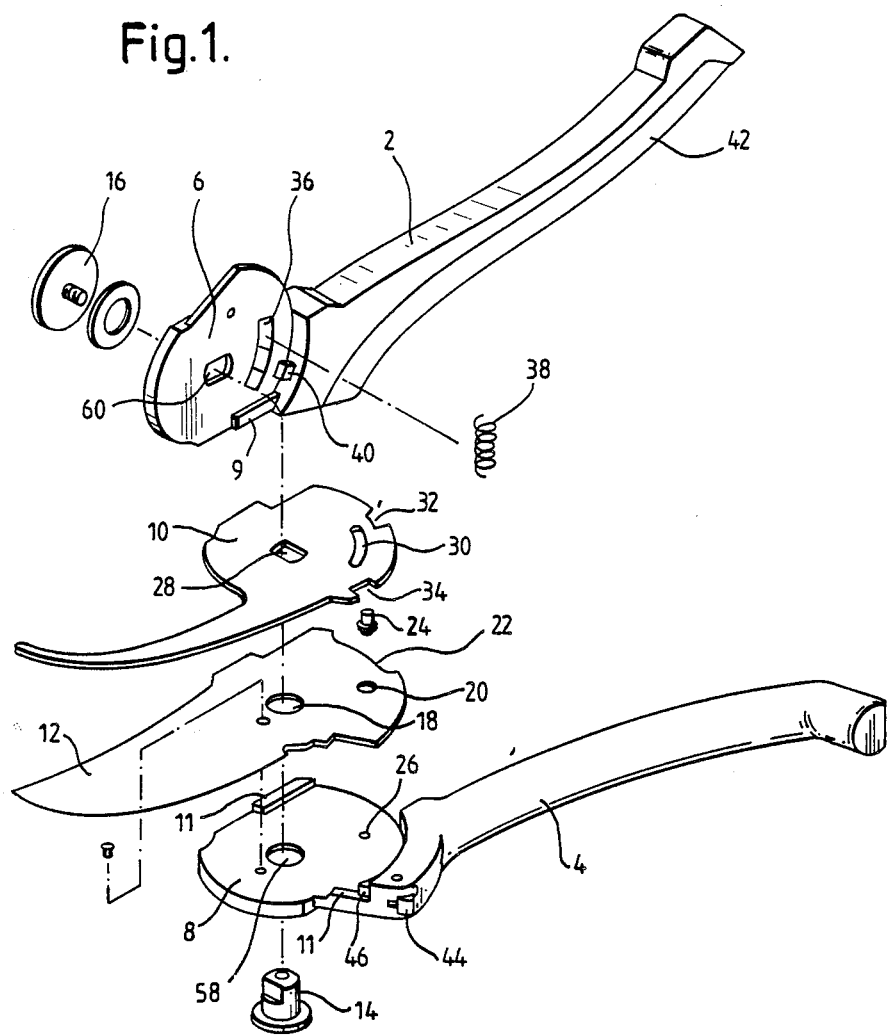
FIG. 1 is an exploded perspective view of a first embodiment of secateurs according to the invention.
Figure 2:
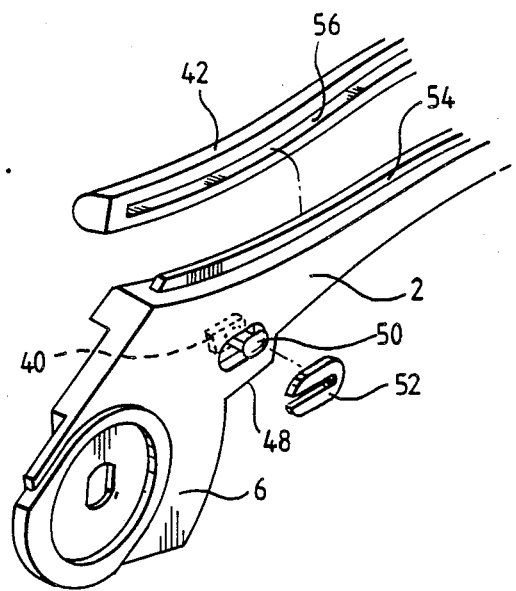
FIG. 2 is a perspective view showing the other side and more detail of the upper handle of the embodiment of secateurs shown in FIG. 1.

The secateurs have two features which make them particularly comfortable to rise. Gardeners, particularly professional gardeners, frequently have to carry out a very large number of pruning operations in a given time, and the continual closing of the handles can be tiring and uncomfortable. In this embodiment, the upper handle 2 is provided with a resilient padded portion 42 which, as can be seen from FIG. 2, is fitted to the handle 2 by engaging a rib 54 of the handle in an associated slot 56 of the resilient material 42. In cross-section the rib bulges so that the portion 42 snaps over it. Alternatively adhesive may be used. The resilient material 42 cushions the user's hand during use of the secateurs.

The second feature takes it possible to reduce the extent to which the blades 10 and 12 spring open, thus reducing the amount of travel between the handles 2 and 4 during each pruning operation. This in turn reduces the work that has to be done by the user's hand.

This is achieved by providing, on the handle 2, a slidable catch member 50 which is provided with a nose 40. The catch 50 is trapped within the handle 2 by a piece of moulded material 52, as seen in FIG. 2. If the catch 50 is fully retracted, as shown in FIGS. 4 and 5, then the jaws 10 and 12 can open to their maximum extent as shown in FIG. 5. However, in the closed position shown in FIG. 4, the catch member 50 can be moved to the left as viewed in the Figure, so that the nose 40 engages in a groove 22 in the blade 12. With the catch in this position, the blades reach their maximum open position, when the nose 40 reaches the upper end of the groove 22 as viewed in FIG. 4. It will be seen from a comparison of FIGS. 4 and 5 that in this position, the maximum opening of the blade will be noticeably reduced.

Another advantage of this embodiment of secateurs is that secateurs can be adapted to a variety of different uses, without the use of tools, by rapidly interchanging the by-pass blades 10 and 12, shown in FIGS. 1 to 5, by either of a pair of further blades.

Figure 6A:
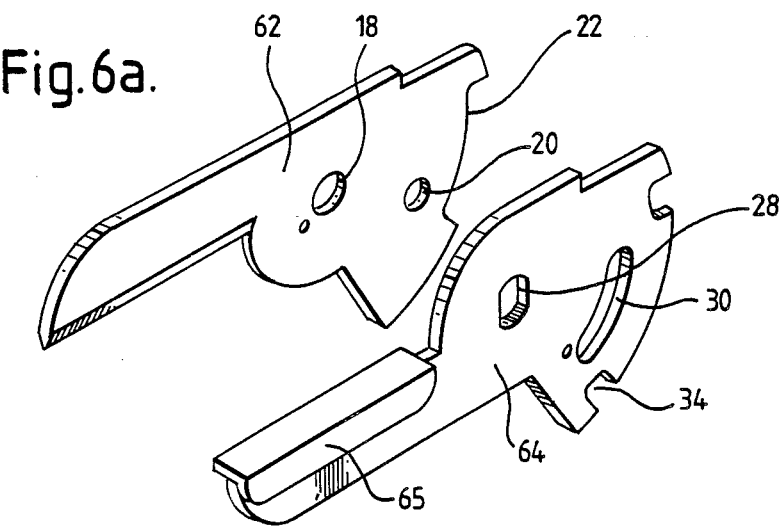
FIG. 6a shows an alternative pair of blades for the secateurs.

The first pair of blades comprises an anvil type pair of blades as shown in FIG. 6a. There is a cutting blade 62, which co-operates with a second blade 64 having an anvil surface 65. Apart from the actual cutting portions, the blades 62 and 64 are shaped similarly to the blades 10 and 12, so that they can be fitted to the handles 2 and 4. In other words, the blade 62 has a pivot hole 18, spring pin hole 20, and opening adjustment slot 22. The blade 64 has a hole 28 to mate with the flat portion of the nut 14, a spring pin slot 30, and a locking catch slot 34. The anvil may be of plastics material to prevent or reduce blade damage. The anvil may be replaceable or interchangeable.

Figure 6B:
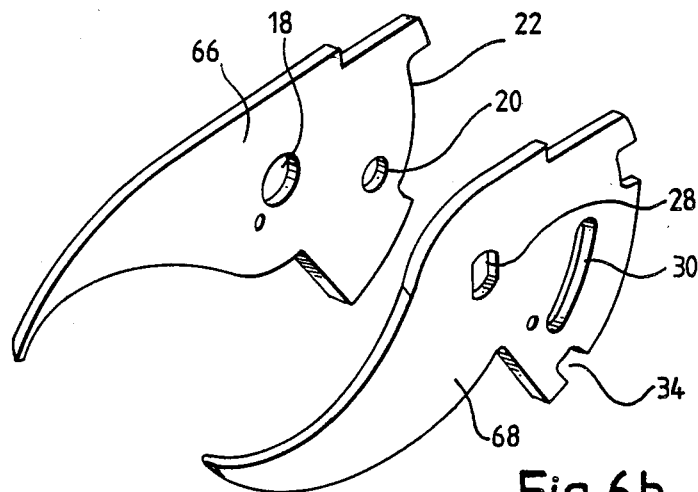
FIG. 6b shows yet another pair of blades for the secateurs.

FIG. 6b shows a pair of parrot beak type blades 66 and 68. Once again the blades are provided with features such aS 18 and 28, to make them suitable for fitting to handles 2 and 4.

Not only does the ability to change or interchange blades quickly increase the versatility of the product, but it also means that if blades become worn or damaged, they can be replaced without the need to replace the entire tool.

Many pairs of existing secateurs have an external exposed spring for urging the handles apart, and this spring can cause discomfort to a user of the secateurs, for example by abrasion of the skin. However, with the secateurs according to this embodiment, the spring 38 is completely concealed and protected within the assembled secateurs.

Turning now to the alternative embodiment shown in FIGS. 7 to 10, there are many similarities, and like parts have like reference numerals.

For example, as with the first embodiment, the top handle or upper body 2 of the secateurs includes the soft contoured cushion grip 42, for example of soft plastics or rubber material, which prevents jarring to the hand when cutting through hard materials. The cushion grip may be secured by adhesive or by some mechanical keying arrangement. A co-operating dove tail cross section rib and groove may for example be used.

Figure 8:
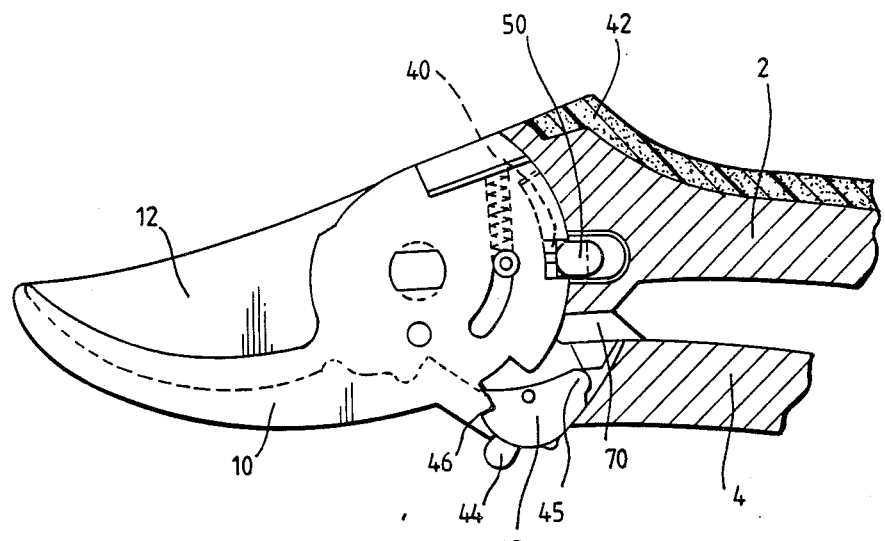
FIG. 8 is a view similar to FIG. 4 but showing the second embodiment.
Figure 9:
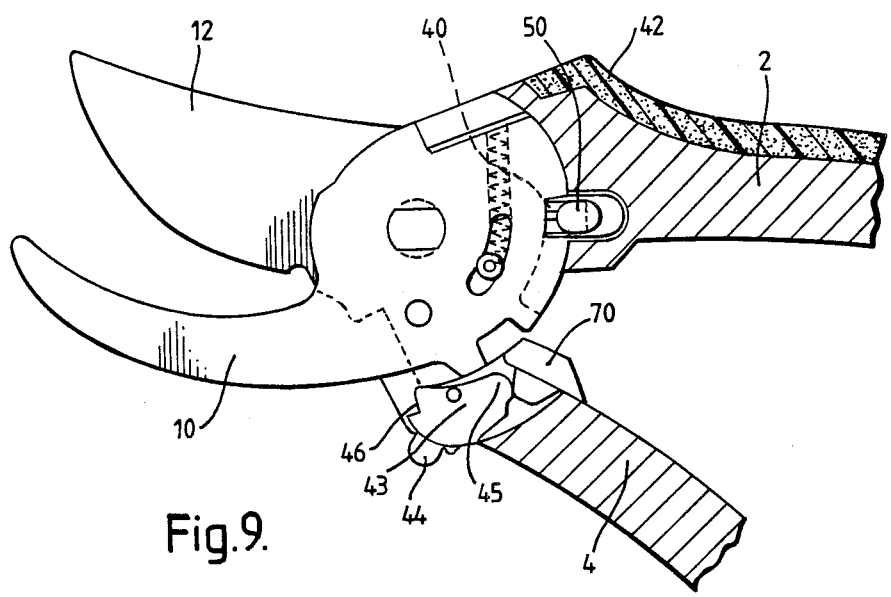
FIG. 9 is a view similar to FIG. 5 but showing the second embodiment.

To further reduce jarring, this embodiment is provided with a cushion stop 70, as perhaps best seen in FIGS. 8 and 9. The handle 4 is provided with a block 70 of resilient material which engages against an associated projection on the handle 2 as the handles come together.

The cushion grip 42 has the additional function of providing a more comfortable, non-slip grip for prolonged use.

As with the first embodiment, the secateurs can, when not in use, be held in a closed, safe configuration by means of a conveniently situation locking catch 43. In this embodiment, a stop face 46 of the catch 43 engages in a locking catch slot 34 in the blade 10. When in the locking position, as shown in FIG. 8, the compression spring 38 is held in compression.

The catch 43 also has a lobe 45 and in the position shown in FIG. 8, the lobe 45 has ridden beneath an underside projection of the cushion stop 70 to assist in positive locking of the secateurs. In other words, the underside projection of the cushion stop 70 defines positive on and off positions for the catch 43, dependent upon whether or not the lobe 45 is pushed under, or clear of, the underside projection of the cushion stop 70.

Figure 7:
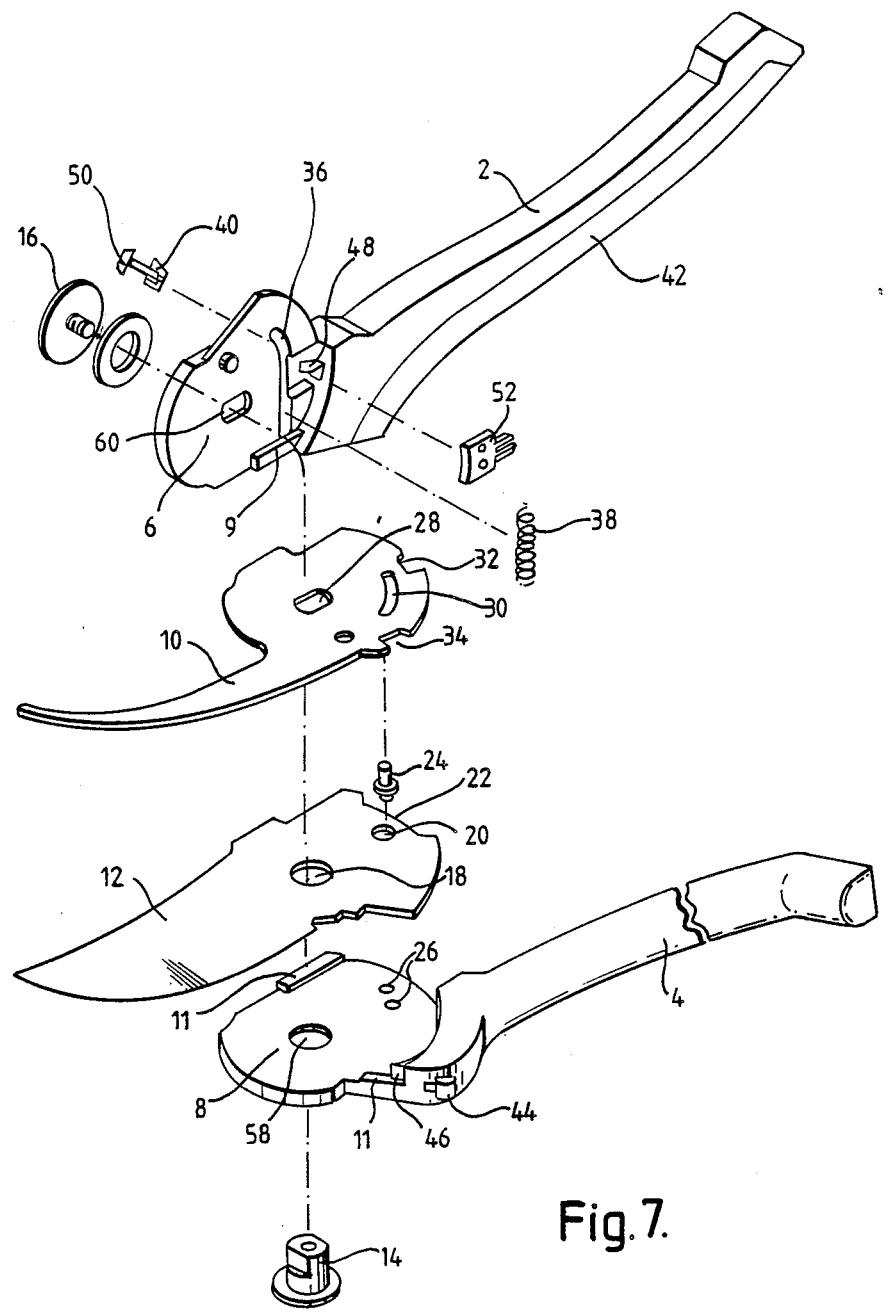
FIG. 7 is a view similar to FIG. 1 but showing a second embodiment of secateurs according to the invention.

It will be seen from FIG. 7 that the arrangement for housing the compression spring 38 is slightly different. Although the slot 30, along which the pin 24 moves, is substantially identical, the recess 36 which houses the spring has a straight portion, in which the spring is fully accommodated in the compressed position, as can be seen from FIG. 8.

There is also a difference in the device for selecting a preferred handle opening to conserve effort in use, select blade opening width to suit size of growth to be cut and further compensate for the variations of the sizes of human hand.

As with the first embodiment, there is a catch 50 having a nose 40, movement of the catch 50 being controlled by a slider member 52.

FIG. 9 illustrates the secateurs in the restricted opening position. In this position, the nose 40 engages in the recess 32 in the lower blade 10, and co-operates with the opening adjustment slot 22 of the top blade 12. When the catch 50 is moved to disengage the nose 40, the secateurs are able to open fully to the full extent of the spring pin slot 30 in the lower blade 10.

With this embodiment, it is also possible to replace the blades either with new blades, when the existing blades become worn or damaged, or with different types of blades, when it is desired to carry out different types of operations. FIG. 10*a* shows a pair of anvil blades 62 and 64 for use with this embodiment, and FIG. 10*b* shows a pair of parrot beak type blades for use with this embodiment.

To replace or interchange the blades, the adjusting screw 60 is completely unscrewed from the nut 14 with the secateurs in the fully open position. The two modules shown in FIG. 7 will then separate immediately. The blades can be readily removed from the modules and relocated on their respective stops before reassembly.

The reader's attention is directed to all papers and documents which are filed concurrently with or previous to this specification and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A pair of secateurs comprising:

a first module having a first handle and a first blade, said first blade having a first butt portion and a first cutting portion, said first handle having a profile shaped to engage around said first butt portion in a manner which prevents rotation of said first blade with respect to said first handle;

a second module having a second handle and a second blade, said second blade having a second butt portion and a second cutting portion, said second handle having a profile shaped to engage around said second butt portion in a manner which prevents rotation of said second blade with respect to said second handle;

a first passage extending through said first handle and said first blade;

a second passage extending through said second handle and said second blade;

first and second screw threaded members which co-operate to provide fastening means extending through said first and second passages to secure said modules together such that when said first and second handles are moved towards one another, said first and second cutting portions move towards one another to perform a cutting operation;

one of said screw threaded members having means for preventing its rotation with respect to the secateurs, the other screw threaded member having a shape which is readily grippable between the fingers for rotating said other member, one of the screw threaded members having a relatively large friction face, rotation of the rotatable screw threaded member in one direction causing said relatively large friction face to be compressed against the secateurs, and rotation of the rotatable screw threaded member in the other direction causing disassembly of said first and second handles from said first and second blades, so that the blades can be replaced by new or different blades without the use of tools.

2. A pair of secateurs as claimed in claim 1, wherein said profile of each of said first and second handles comprises a face shaped to receive the respective butt portions of said first and second blades.

3. A pair of secateurs as claimed in claim 2, wherein each said face is provided with holes, pegs, cut-outs, projections or the like.

4. A pair of secateurs as claimed in claim 1, wherein said shape of said other screw threaded member comprises a prominent rib which is readily grippable between the fingers for rotating said other member.

5. A pair of secateurs as claimed in claim 1, in combination with at least one pair of replacement blades of different configuration so that the secateurs can be adapted for different uses.

6. A pair of secateurs as claimed in claim 1, and further comprising locking means for locking said first and second modules in their closed position.

7. A pair of secateurs as claimed in claim 6, wherein said locking means comprises a trigger positioned in a lower region of one of said first and second modules for convenient operation by a forefinger of a user.

8. A pair of secateurs, as claimed in claim 7, wherein said trigger cooperates with part of one said first and second modules such that said trigger has snap-action movement between clearly defined on and off positions.

9. A pair of secateurs as claimed in claim 8, wherein said part comprises a piece of cushioning material acting between said first and second handles.

10. A pair of secateurs as claimed in claim 1, and further comprising limiting means for limiting the extent to which said first and second blades move apart from each other.

11. A pair of secateurs as claimed in claim 10, in which said limiting means defines two limiting positions, whereby either one of two different open positions of said blades may be selected according to circumstances of use.

12. A pair of secateurs as claimed in claim 11, wherein in one limiting position said blades move through an arc of approximately 45° and in another limiting position move through an arc of approximately 30°.

13. A pair of secateurs as claimed in claim 10, wherein said limiting means is operable by means of a catch member.

14. A pair of secateurs as claimed in claim 1, wherein at least one of said first and second handle is provided with first cushioning means for cushioning the handle.

15. A pair of secateurs as claimed in claim 1, wherein second cushioning means is provided for cushioning engagement of said first and second handles as said first and second blades close.

16. A pair of secateurs as claimed in claim 1, and further comprising spring means for urging said first and second handles and said first and second blades apart.

17. A pair of secateurs as claimed in claim 16, wherein said spring means is enclosed and protected within one of said profiles.

18. A pair of secateurs, comprising:
a first module having a first handle and a first blade, said first blade having a first butt portion and a first cutting portion, said first handle having a profile shaped for engagement around said first butt portion in a manner which prevents rotation of said first blade with respect to said first handle;
a second module having a second handle and a second blade, said second blade having a second butt portion and a second cutting portion, said second handle having a profile shaped for engagement around said second butt portion in a manner which prevents rotation of said second blade with respect to said second blade;
a first passage extending through said first handle and said first blade;
a second passage extending through said second handle and said second blade;
fastening means for securing said first and second modules together, said fastening means including first and second screw threaded members which are threadedly engageable with each other, such that when said first and second handles are moved towards one another, said first and second cutting portions move towards one another to perform a cutting operation, said other screw threaded member being shaped to be readily grippable between the fingers for rotating said other screw threaded member;
means for preventing rotation of one of said screw threaded members with respect to said first and second modules;
one of said screw threaded members having a relatively large friction face, rotation of the rotatable screw threaded member in one direction causing said relatively large friction face to be compressed against one of said first and second modules to adjust the force required to operate the secateurs, and rotation of the rotatable screw threaded member in the other direction causing disassembly of the first and second modules from each other and disassembly of said first and second handles from said first and second blades, whereby said blades can be replaced by new or different blades without the use of tools.

* * * * *